(12) United States Patent
Chen et al.

(10) Patent No.: US 9,319,953 B2
(45) Date of Patent: Apr. 19, 2016

(54) APPARATUSES AND METHODS FOR HANDOVERS BETWEEN HETEROGENEOUS NETWORKS

(71) Applicant: HTC Corporation, Taoyuan, Taoyuan County (TW)

(72) Inventors: Hsi-Kun Chen, Taoyuan (TW); Peter Chou, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/709,225

(22) Filed: May 11, 2015

(65) Prior Publication Data

US 2015/0245265 A1   Aug. 27, 2015

Related U.S. Application Data

(62) Division of application No. 13/569,901, filed on Aug. 8, 2012.

(60) Provisional application No. 61/522,045, filed on Aug. 10, 2011.

(51) Int. Cl.
*H04W 36/14* (2009.01)
*H04W 36/30* (2009.01)
*H04W 88/06* (2009.01)

(52) U.S. Cl.
CPC .............. *H04W 36/14* (2013.01); *H04W 36/30* (2013.01); *H04W 88/06* (2013.01)

(58) Field of Classification Search
CPC ..... H04W 36/00; H04W 36/14; H04W 36/30; H04W 88/06
USPC ................ 455/436, 502, 432.1, 67.11, 456.1, 455/456.2, 342; 370/331, 338, 351
See application file for complete search history.

(56) References Cited

U.S. PATENT DOCUMENTS

| | | | | |
|---|---|---|---|---|
| 7,161,914 | B2 * | 1/2007 | Shoaib | H04W 36/24 370/331 |
| 7,363,037 | B2 * | 4/2008 | Huang | H04W 36/24 370/331 |
| 8,064,911 | B2 * | 11/2011 | Kim | H04W 36/30 455/436 |
| 8,270,981 | B2 * | 9/2012 | Cho | H04W 36/14 455/418 |
| 8,577,369 | B2 * | 11/2013 | Achtari | H04W 36/0083 370/331 |
| 8,660,029 | B2 * | 2/2014 | Lee | H04W 36/14 370/252 |

(Continued)

FOREIGN PATENT DOCUMENTS

| | | |
|---|---|---|
| CN | 1917704 A | 2/2007 |
| CN | 101808378 A | 8/2010 |
| EP | 1 439 725 B1 | 8/2006 |

*Primary Examiner* — Pablo Tran
(74) *Attorney, Agent, or Firm* — Birch, Stewart, Kolasch & Birch, LLP

(57) ABSTRACT

A mobile communication device is provided with a plurality of processing logic units. A first processing logic unit is configured to connect the mobile communication device to a first wireless network for wireless transceiving via a first link. A second processing logic unit is configured to determine whether a second link to a second wireless network is available in response to detecting a low performance condition of the first link. Particularly, the first wireless network and the second wireless network are heterogeneous networks. A third processing logic unit is configured to hand over the mobile communication device from the first wireless network to the second wireless network in response to a transceiving rate of the second link being greater than a first value.

8 Claims, 10 Drawing Sheets

(56) References Cited

U.S. PATENT DOCUMENTS

| | | | |
|---|---|---|---|
| 8,701,164 B2* | 4/2014 | Dutta | H04W 12/06 370/331 |
| 2006/0187882 A1 | 8/2006 | Kwak et al. | |
| 2007/0026861 A1* | 2/2007 | Kuhn | H04W 36/26 455/436 |
| 2007/0070948 A1* | 3/2007 | Kezys | H04L 12/6418 370/331 |
| 2008/0096560 A1* | 4/2008 | Felske | H04W 36/0083 455/436 |
| 2008/0304458 A1 | 12/2008 | Aghvami et al. | |
| 2009/0325581 A1* | 12/2009 | Lu | H04W 36/005 455/436 |
| 2010/0238833 A1 | 9/2010 | Li et al. | |
| 2013/0021929 A1* | 1/2013 | Kim | H04B 7/024 370/252 |
| 2013/0040693 A1* | 2/2013 | Chen | H04W 36/30 455/525 |

* cited by examiner

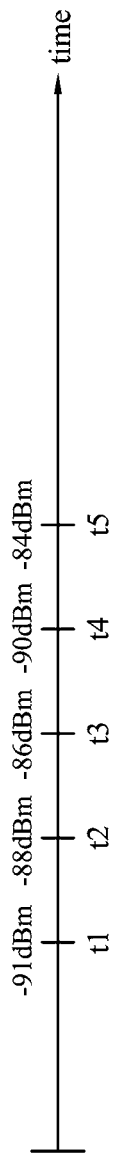
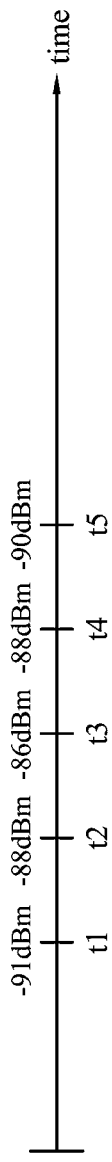
FIG. 8A
FIG. 8B

APPARATUSES AND METHODS FOR HANDOVERS BETWEEN HETEROGENEOUS NETWORKS

CROSS-REFERENCE TO RELATED APPLICATIONS

This application is a Divisional of co-pending application Ser. No. 13/569,901, filed on Aug. 8, 2012, the entire contents of which are hereby incorporated by reference and for which priority is claimed under 35 U.S.C. §120. This application also claims priority to U.S. Provisional Application No. 61/522,045, filed on Aug. 10, 2011, the entire contents of which are hereby incorporated by reference.

BACKGROUND OF THE INVENTION

1. Field of the Invention

The invention generally relates to handovers in the field of wireless communications, and more particularly, to apparatuses and methods for handovers between heterogeneous networks to improve the performance of wireless transceiving.

2. Description of the Related Art

With growing demand for ubiquitous computing and networking, various wireless technologies have been developed, such as the Wireless Fidelity (WiFi) technology, Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and others. For user convenience and flexibility, most Mobile Stations (MSs) nowadays are equipped with more than one wireless communication module for supporting different wireless technologies. However, each wireless technology has its own features, such as bandwidth, average coverage, and service rate, etc. Particularly, the bandwidth and coverage provided to an MS by a wireless network may vary according to the location conditions of the MS and/or the time condition.

Take an MS operating in either an Android or a Windows system, which supports WiFi and WCDMA technologies, for example. The MS always selects a WiFi network over a WCDMA network, even if the signal quality of the WiFi network is bad while the signal quality of the WCDMA network is fair/good. That is, the MS is configured to stay connected with the WiFi network with bad signal quality, regardless of the availability of the WCDMA network with fair/good signal quality. In such circumstances, even browsing a web page may take a long time, and accordingly, the user may experience a serious delay of wireless connectivity. Thus, to improve the performance of wireless transceiving, it is desirable to provide smart handovers between heterogeneous networks.

BRIEF SUMMARY OF THE INVENTION

In one aspect of the invention, a mobile communication device is provided. The mobile communication device comprises a first processing logic unit, a second processing logic unit, and a third processing logic unit. The first processing logic unit is configured to connect the mobile communication device to a first wireless network for wireless transceiving via a first link. The second processing logic unit is configured to determine whether a second link to a second wireless network is available in response to detecting a low performance condition of the first link, wherein the first wireless network and the second wireless network are heterogeneous networks. The third processing logic unit is configured to hand over the mobile communication device from the first wireless network to the second wireless network in response to a transceiving rate of the second link being greater than a first value.

In another aspect of the invention, a method for a mobile communication device to handover between a plurality of heterogeneous networks is provided. The method comprises the steps of connecting to a first wireless network for wireless transceiving via a first link, determining whether a second link to a second wireless network is available in response to detecting a low performance condition of the first link, wherein the first wireless network and the second wireless network are heterogeneous networks, and handing over the mobile communication device from the first wireless network to the second wireless network in response to a transceiving rate of the second link being greater than a first value.

In yet another aspect of the invention, a mobile communication device is provided. The mobile communication device comprises a first processing logic unit, a second processing logic unit, a third processing logic unit, and a fourth processing logic unit. The first processing logic unit is configured to connect the mobile communication device to a first wireless network for wireless transceiving via a first link. The second processing logic unit is configured to scan for a nearby second wireless network with a current signal quality, wherein the first wireless network and the second wireless network are heterogeneous networks. The third processing logic unit is configured to apply a condition check on the current signal quality of the second wireless network according to a result of whether the mobile communication device was previously connected to the second wireless network prior to being connected to the first wireless network. The fourth processing logic unit is configured to hand over the mobile communication device from the first wireless network to the second wireless network in response to passing of the condition check.

In still another aspect of the invention, a method for a mobile communication device to handover between a plurality of heterogeneous networks is provided. The method comprises the steps of connecting to a first wireless network for wireless transceiving via a first link, scanning for a nearby second wireless network with a current signal quality, wherein the first wireless network and the second wireless network are heterogeneous networks, applying a condition check on the current signal quality of the second wireless network according to a result of whether the mobile communication device was previously connected to the second wireless network prior to being connected to the first wireless network, and handing over the mobile communication device from the first wireless network to the second wireless network in response to passing of the condition check.

Other aspects and features of the present invention will become apparent to those with ordinarily skill in the art upon review of the following descriptions of specific embodiments of the mobile communication devices and the methods for a mobile communication device operating as an MS to handover between a plurality of heterogeneous networks.

BRIEF DESCRIPTION OF DRAWINGS

The invention can be more fully understood by reading the subsequent detailed description and examples with references made to the accompanying drawings, wherein:

FIG. 8A is a schematic diagram illustrating RSSI changes for inward movement towards a WLAN according to an embodiment of the invention;

FIG. 8B is a schematic diagram illustrating RSSI changes for outward movement from a WLAN according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
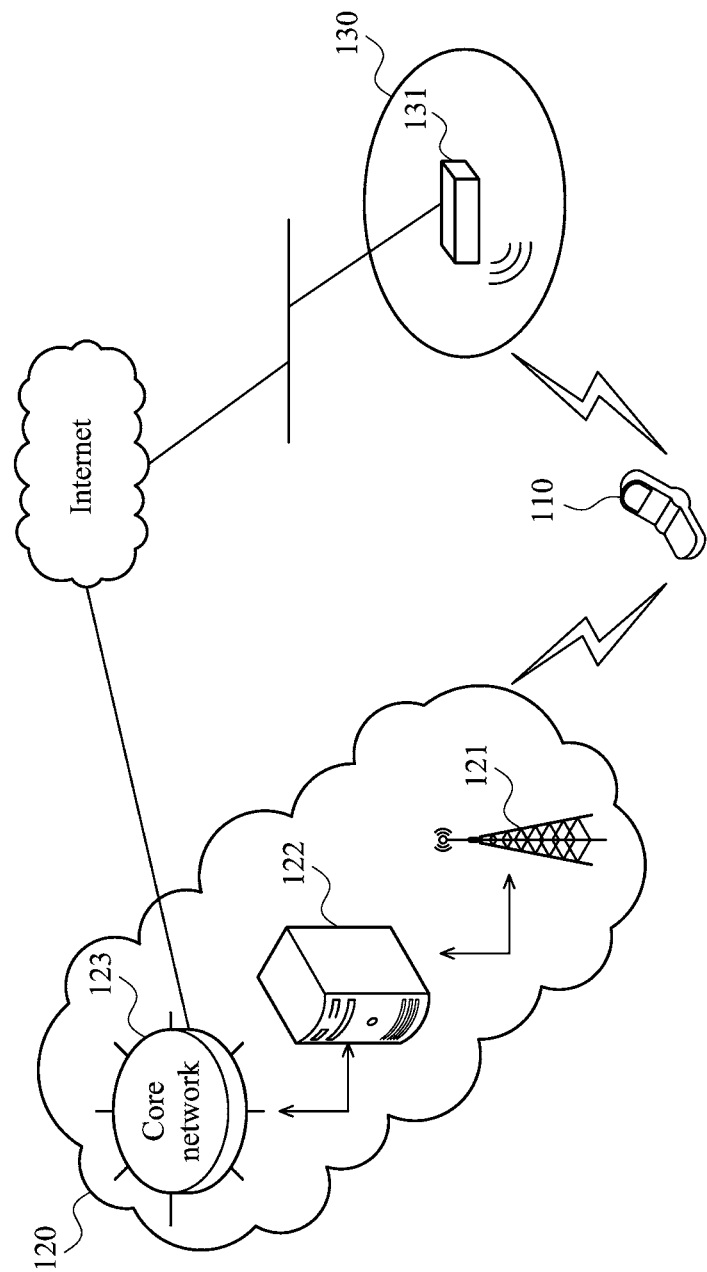
FIG. 1 is a block diagram of a wireless communications environment according to an embodiment of the invention.

FIG. 1 is a block diagram of a wireless communications environment according to an embodiment of the invention. The wireless communications environment 100 comprises a mobile communication device 110, a cellular network 120 and a non-cellular network 130. The mobile communication device 110 may selectively connect to one or both of the cellular network 120 and the non-cellular network 130 for obtaining wireless services. The cellular network 120 may be a GSM system, GPRS system, WCDMA system, CDMA-2000 system, TD-SCDMA system, WiMAX system, LTE system, or TD-LTE system, etc., depending on the Radio Access Technology (RAT) in use. The cellular network 120 comprises at least one cellular station 121 (or so-called base station or access station), at least one control node 122, and a core network 123, wherein the cellular station 121 is controlled by the control node 122 to provide the functionality of wireless transceiving for the cellular network 120, and the cellular station 121 and the control node 122 together may be referred to as a radio access network or access network. For example, if the cellular network 120 is a WCDMA system, the cellular station 121 may be a NodeB, the control node 122 may be a Radio Network Controller (RNC), and the core network 123 may be a General Packet Radio Service (GPRS) core which includes a Home Location Register (HLR), at least one Serving GPRS Support Node (SGSN), and at least one Gateway GPRS Support Node (GGSN). Alternatively, the cellular network 120 may not comprise any control node. For example, if the cellular network 120 is an LTE system, the cellular station 121 may be an Evolved-NodeB (E-NodeB), and the core network 123 may be an Evolved Packet Core (EPC) which includes a Home Subscriber Server (HSS), Mobility Management Entity (MME), Serving Gateway (S-GW), and Packet Data Network Gateway (PDN-GW or P-GW).

The non-cellular network 130 may be a Wireless Local Area Network (WLAN), a Bluetooth Personal Area Network (BT PAN), ZigBee Wireless PAN (ZigBee WPAN), or others, implemented as an extension of wired local area networks and may be able to provide the last few meters of connectivity between a wired network and mobile or fixed devices. As shown in FIG. 1, the non-cellular network 130, which is illustrated as a WLAN for example, is established by an Access Point (AP) 131 which may connect to a local area network by an Ethernet cable. The AP 131 typically receives, buffers, and transmits data between the WLAN and the wired network infrastructure. The AP 131 may have, on average, a coverage varying from 20 meters in an area with obstacles (walls, stairways, elevators etc) to 100 meters in an area with clear line of sight. Note that, in the following description, the WLAN is only given as an example, and the invention is not limited thereto. Alternatively, the non-cellular network 130 may be a BT PAN, ZigBee WPAN, or others.

The mobile communication device 110 may also be referred to as a Mobile Station (MS), Mobile Terminal (MT), or User Equipment (UE). For example, the mobile communication device 110 may be a mobile phone (also known as a cellular or cell phone), a smart phone, a laptop computer with wireless communications capability, or others. The mobile communication device 110 may comprise two wireless modules (not shown) for performing the functionality of wireless transceiving to and from the cellular network 120 and the non-cellular network 130. To further clarify, each wireless module may comprise a Baseband unit (not shown) and a Radio Frequency (RF) unit (not shown). The Baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the Baseband unit, or receive baseband signals from the Baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 2.4 GHz utilized in WiFi systems, or 900 MHz, 1900 MHz, or 2100 MHz utilized in WCDMA systems, or may be 900 MHz, 2100 MHz, or 2.6 GHz utilized in LTE systems, or others depending on the RAT in use. Also, the mobile communication device 110 may comprise a controller module (not shown) for controlling the operation of the two wireless modules and other functional components, such as a display unit and/or keypad serving as a Man-Machine Interface (MMI), a storage unit storing the program codes of applications, or others. Alternatively, the two wireless modules may negotiate with each other for coordinating the respective operations thereof, without any mediator, e.g., the controller module.

Figure 2:
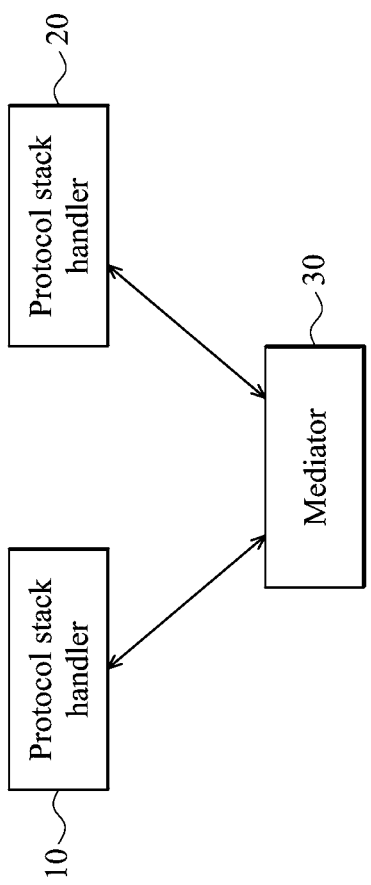
FIG. 2 is a block diagram illustrating an exemplary software architecture of the mobile communication device 110 according to an embodiment of the invention.
Figure 3:
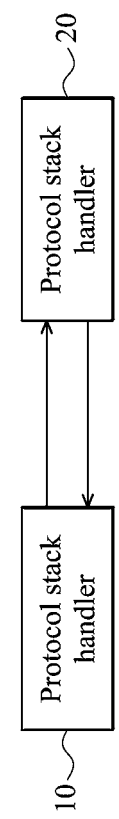
FIG. 3 is a block diagram illustrating an exemplary software architecture of the mobile communication device 110 according to another embodiment of the invention.

FIG. 2 is a block diagram illustrating an exemplary software architecture of the mobile communication device 110 according to an embodiment of the invention. In the exemplary software architecture, two protocol stack handlers 10 and 20, each of which may be implemented as program code, when loaded and executed by a processing unit or Micro-Processing Unit (MCU) (e.g., an MCU of a Baseband unit) with a plurality of processing logic units, are configured to communicate with the cellular network 120 and the non-cellular network 130, respectively, in compliance with a respective wireless communication protocol. Also, the exemplary software architecture includes an mediator 30 which may be implemented as program code and when loaded and executed by a processing unit or MCU with a plurality of processing logic units, is configured to control/coordinate the operations of the protocol stack handler 10 and 20 to practice the smart handover method of the invention. Alternatively, in another embodiment as shown in FIG. 3, the protocol stack handler 10 and 20 may directly negotiate with each other for coordinating the respective operations thereof to practice the smart handover method of the invention, without the mediator 30.

Figure 4:
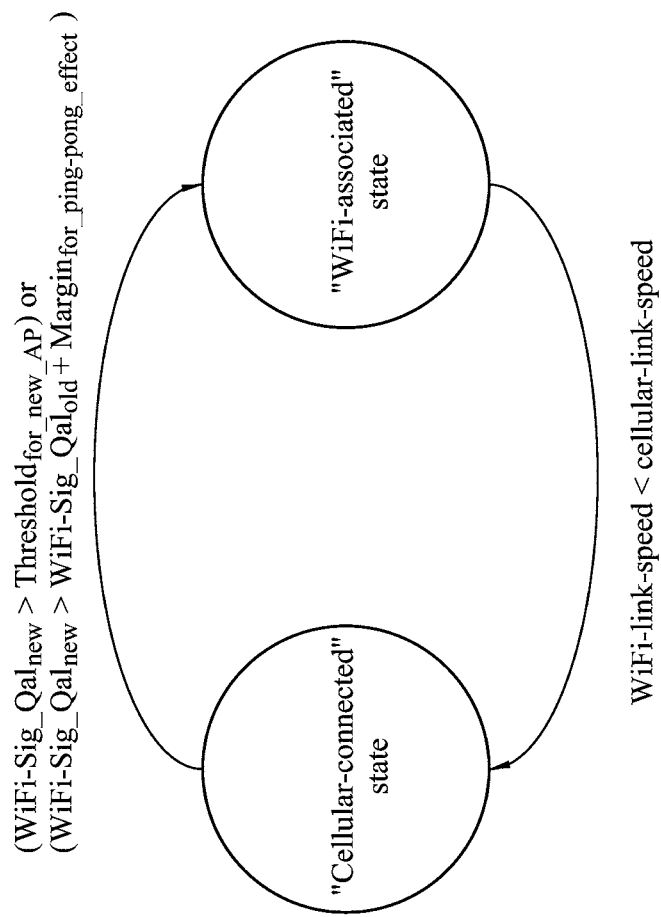
FIG. 4 is a state transition diagram illustrating state machine operations of the mobile communication device 110 according to an embodiment of the invention.
Figure 5:
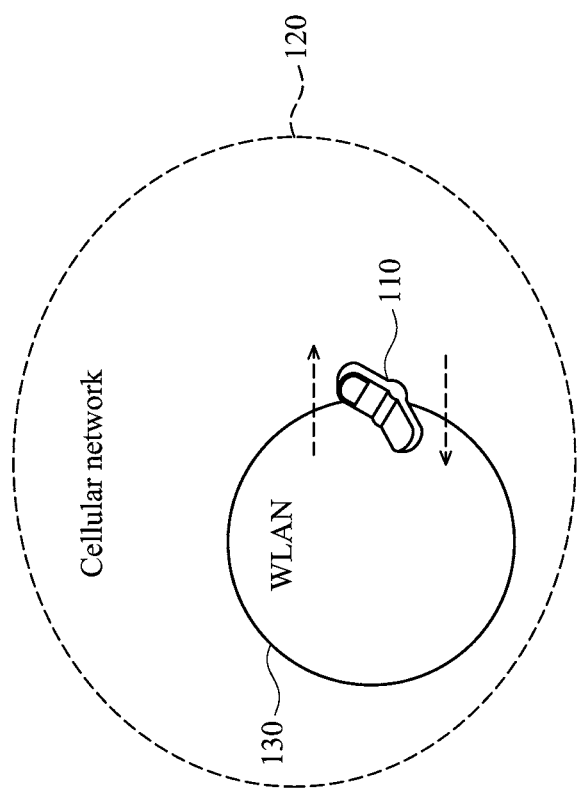
FIG. 5 is a schematic diagram illustrating the ping-pong effect for the mobile communication device 110 wandering around the coverage edge of the WLAN 130 and the coverage of the cellular network 120.

Specifically, the mobile communication device 110 is capable of performing smart handovers between the cellular network 120 and the non-cellular network 130 for obtaining wireless services with fair transceiving rates. FIG. 4 is a state transition diagram illustrating state machine operations of the mobile communication device 110 according to an embodiment of the invention. The "Cellular-connected" state represents a state where the mobile communication device 110 is connected to the cellular network 120 for obtaining wireless services, while the "WiFi-associated" state represents a state where the mobile communication device 110 is connected to the non-cellular network 130 for obtaining wireless services. For the case where the mobile communication device 110 is in the "Cellular-connected" state, if a new AP is detected with a signal quality greater than a threshold value, the mobile communication device 110 may disconnect with the cellular network 120 and connect to the non-cellular network 130 via the new AP, and then enter the "WiFi-associated" state. In one embodiment, the signal quality of the AP may be determined by measuring the Received Signal Strength Indicator (RSSI) of the signals from the AP. Note that, other measuring indicators, such as Signal to Noise Ratio (SNR), Interference to Signal Ratio (ISR), Packet Error Rate (PER), and Bit Error Rate (BER), etc., may be employed for determining the signal quality of an AP, and the invention is not limited thereto. In another situation, if the signal quality of a previously detected AP increases so that the currently detected signal quality is greater than the sum of the previously detected signal quality and a margin value, the mobile communication device 110 may disconnect with the cellular network 120 and connect to the non-cellular network 130 via the AP, and then enter the "WiFi-associated" state. To further clarify, the margin value may be a predetermined buffer to eliminate the ping-pong effect as shown in FIG. 5. Particularly, the ping-pong effect occurs when the coverage of the cellular network 120 and the non-cellular network 130 overlap and the mobile communication device 110 wanders near the coverage edge of the non-cellular network 130. Around the coverage edge, the signal quality of the non-cellular network 130 may be weak and unstable, and without the margin value, handovers back and forth between the cellular network 120 and the non-cellular network 130 may be too frequent, thus consuming unnecessary power. Thus, by configuring a proper margin value, frequent handovers between the cellular network 120 and the non-cellular network 130 may be avoided. For the case where the mobile communication device 110 is in the "WiFi-associated" state, if the transceiving rate (referred to herein as "speed" for brevity) of the link to the currently associated AP is lower than the speed of the link to the cellular network 120, the mobile communication device 110 may disconnect with the non-cellular network 130 and connect to the cellular network 120, and then enter the "Cellular-connected" state. To be more specific, the speed of the link to the currently associated AP may be determined according to the transceiving status between the mobile communication device 110 and the associated AP, and the speed of the link to the cellular network 120 may be determined according to the system information broadcasted by the cellular network 120. In another embodiment, the mobile communication device 110 may transit from the "WiFi-associated" state to the "Cellular-connected" state if the speed of the link to the currently associated AP is lower than a predetermined value (e.g., 2 Mbps).

Figure 6:
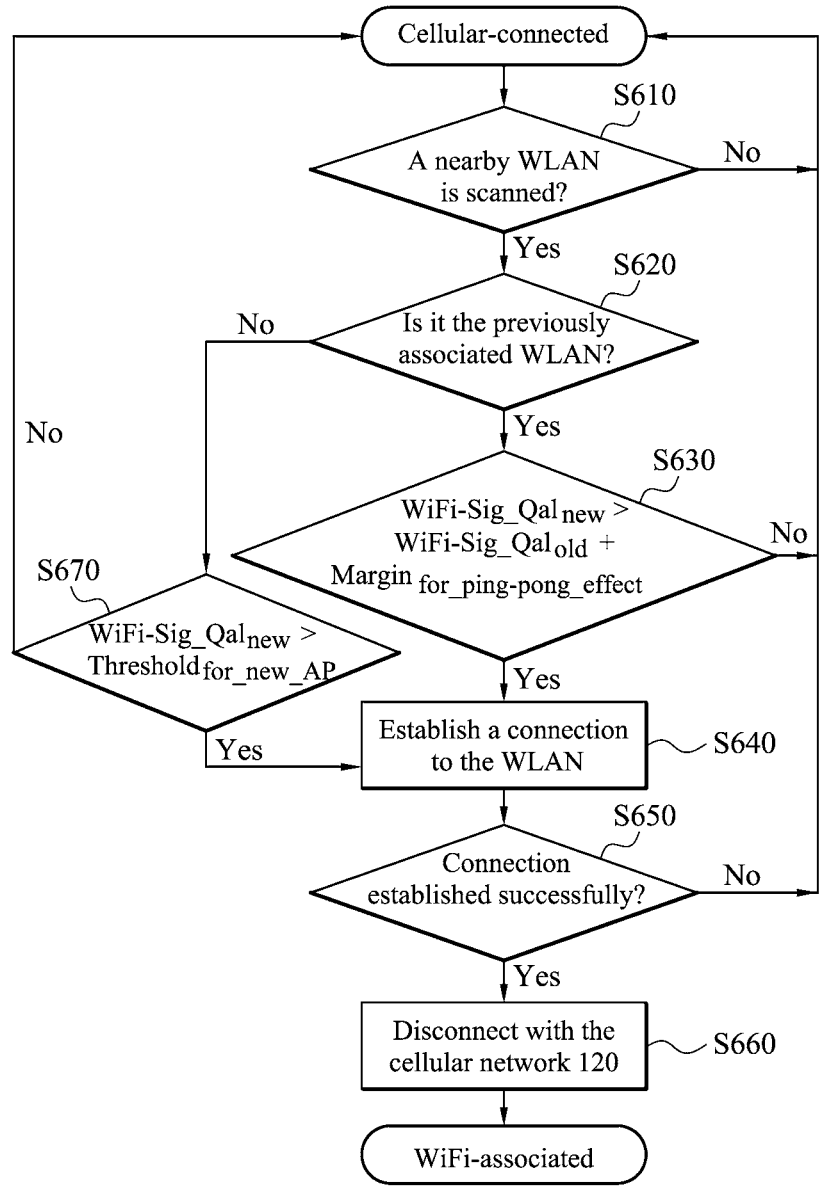
FIG. 6 is a flow chart illustrating a smart handover method for handing over the mobile communication device 110 from the cellular network 120 to the WLAN 130 according to an embodiment of the invention.

FIG. 6 is a flow chart illustrating a smart handover method for handing over the mobile communication device 110 from the cellular network 120 to the non-cellular network 130 according to an embodiment of the invention. In this embodiment, the mobile communication device 110 is initially connected to the cellular network 120 and is in a "Cellular-connected" state. To begin, the mobile communication device 110 periodically scans for any nearby non-cellular network (step S610). If a non-cellular network is detected, the mobile communication device 110 then determines whether it was previously connected to the detected non-cellular network (step S620). If so, the mobile communication device 110 further determines whether the currently detected signal quality of the non-cellular network is greater than the sum of the previously detected signal quality of the non-cellular network and a margin value to eliminate the ping-pong effect (step S630). Specifically, the mobile communication device 110 may distinguish a new non-cellular network from a previously associated non-cellular network by identifying the Media Access Control (MAC) addresses and/or Service Set Identifiers (SSIDs) of all detected non-cellular networks. That is, if the MAC address or SSID of a detected non-cellular network is not found in the connection history stored in the mobile communication device 110, then the detected non-cellular network is a new non-cellular network; otherwise, the detected non-cellular network is a previously associated non-cellular network. It is noted that, there may be a situation where two or more non-cellular networks in an area are configured with the same SSID, and in this case, the MAC address instead of the SSIDs should be used to uniquely identify each one of the non-cellular networks in the area. The previously detected signal quality of the non-cellular network may be the signal quality of the non-cellular network at the time when the mobile communication device 110 decided to perform handover from the non-cellular network to the cellular network 120. If the currently detected signal quality of the non-cellular network is greater than the sum of the previously detected signal quality of the non-cellular network and a margin value to eliminate the ping-pong effect, the mobile communication device 110 conducts handover to the non-cellular network. Specifically, the mobile communication device 110 first tries to establish a connection to the non-cellular network (step S640), and then waits for acceptance of the connection from the non-cellular network (step S650). If the connection is accepted by the non-cellular network, the mobile communication device 110 then disconnects with the cellular network 120 (step S660) and enters the "WiFi-associated" state; otherwise, if the connection is rejected by the non-cellular network, the mobile communication device 110 stays in the "Cellular-connected" state. Subsequent to step S620, if not, i.e., the detected non-cellular network is a new non-cellular network which the MS has never connected to previously, the mobile communication device 110 determines whether the signal quality of the new non-cellular network is greater than a threshold value (step S670). If so, the flow proceeds to step S640, and if not, the flow goes back to the initial state.

Figure 7:
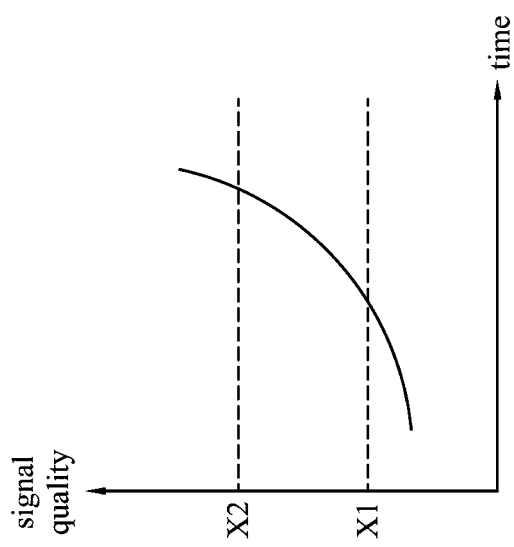
FIG. 7 is a curve diagram illustrating a 2-stage monitoring for the signal quality of nearby WLANs according to an embodiment of the invention.

It is noted that, before performing the smart handover method of FIG. 6, the mobile communication device 110 may first perform a 2-stage monitoring of the signal quality of any nearby non-cellular network, as shown in FIG. 7. In the first stage, the mobile communication device 110 may periodically detect the signal quality of any nearby non-cellular network during every N seconds, wherein N may be configured to be 6, 15, or any other number, depending on the power-saving settings of the mobile communication device 110. Once the signal quality of a non-cellular network is detected to be greater than a first threshold X1, then the mobile communication device 110 proceeds to the second stage where it continues to monitor the signal quality of the detected non-cellular network and detect its moving direction in relation to the detected non-cellular network. When the signal quality of the detected non-cellular network is greater than a second threshold X2 and it is detected that the mobile communication device 110 is moving towards the AP of the detected non-cellular network, the mobile communication device 110 may perform the smart handover method of FIG. 5, wherein the second threshold X2 is greater than the first threshold X1. Specifically, the moving direction of the mobile communication device 110 may be determined by calculating the moving average of the monitored signal quality of the non-cellular network. FIG. 8A is a schematic diagram illustrating RSSI changes for inward movement towards a non-cellular network according to an embodiment of the invention. As shown in FIG. 8A, the RSSIs of the detected non-cellular network monitored at time t1, t2, t3, t4, and t5 are −91 dBm, −88 dBm, −86 dBm, −90 dBm, −84 dBm, respectively, wherein the RSSI monitored at time t4 may be discarded as noise. The moving average of the mobile communication device 110 may be determined by calculating the slope of the monitored RSSIs. Since the slope of the monitored RSSIs is positive, it is determined that the mobile communication device 110 is moving towards the AP of the detected non-cellular network. FIG. 8B is a schematic diagram illustrating RSSI changes for outward movement from a non-cellular network according to an embodiment of the invention. As shown in FIG. B, the RSSIs of the detected non-cellular network monitored at time t1, t2, t3, t4, and t5 are −91 dBm, −88 dBm, −86 dBm, −8 dBm, −90 dBm, respectively, wherein the RSSI monitored at time t3 may be considered as a turning point with respect to the moving direction of the mobile communication device 110. The moving average of the mobile communication device 110 may be determined by calculating the slope of the monitored RSSIs. Since the slope of the monitored RSSIs is negative, it is determined that the mobile communication device 110 is moving away from the AP of the detected non-cellular network. In another embodiment, the Simple Moving Average (SMA) formula may be employed for determining the moving direction of the mobile communication device 110, and the invention is not limited thereto. Note that the detailed descriptions concerning the calculation of the SMA are omitted herein as they are beyond the scope of the invention.

Figure 9:
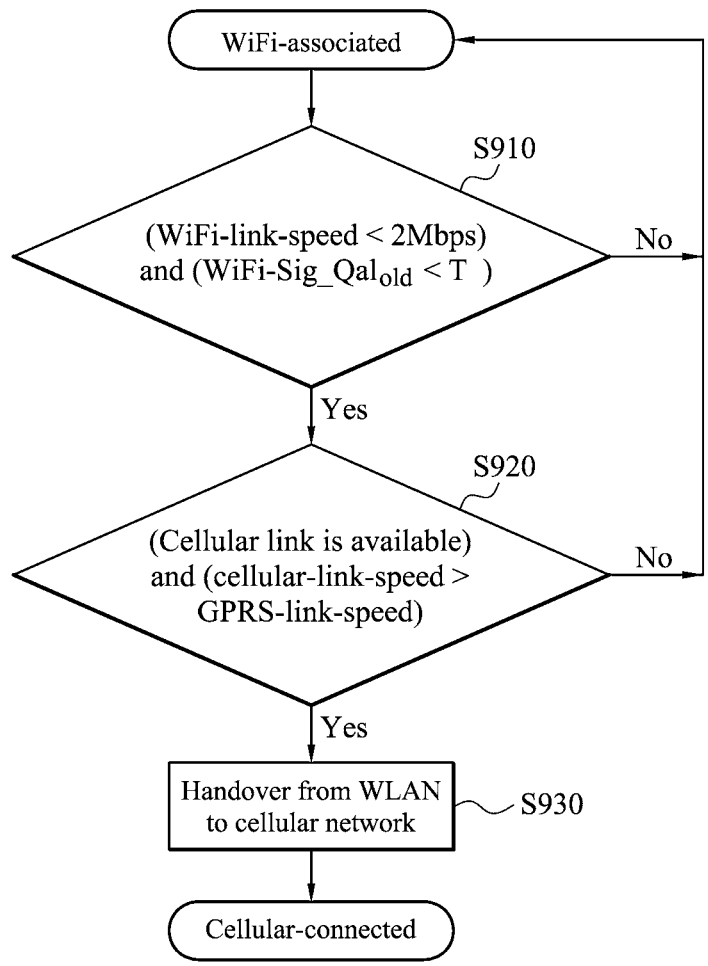
FIG. 9 is a flow chart illustrating a smart handover method for handing over the mobile communication device 110 from the WLAN 130 to the cellular network 120 according to an embodiment of the invention.

FIG. 9 is a flow chart illustrating a smart handover method for handing over the mobile communication device 110 from the non-cellular network 130 to the cellular network 120 according to an embodiment of the invention. In this embodiment, the mobile communication device 110 is initially connected to the non-cellular network 130 and is in a "WiFi-associated" state. To begin, the mobile communication device 110 periodically determines whether the speed of the link to the AP 131 is lower than 2 Mbps and whether the signal quality of the non-cellular network 130 is lower than a threshold T (step S910). Specifically, the speed of the link to the AP 131 may be determined according to the transceiving status between the mobile communication device 110 and the AP 131, and the threshold T is used to eliminate the situation where the mobile communication device 110 may be moving at a high speed away from the AP 131 and used to eliminate the situation where the detected speed of the link to the AP 131 may not be accurate for real-time changes. For example, the speed of the link to the AP 131 detected at time t1 is greater than 2 Mbps and the next periodic detection is 6 seconds thereafter. In this example, the mobile communication device 110 moves rapidly away from the AP 131 to a place where the signal quality of the non-cellular network 130 drops sharply in less than 6 seconds. Note that the speed of the link to the AP 131 detected at time t1 is not accurate enough to be taken as the only measuring factor. Accordingly, the threshold T is used. The value of the threshold T may be predetermined to be a specific number according to any one or more considerations, such as the coverage of the non-cellular network 130, the geological environment of the non-cellular network 130, etc. Note that, the lower bound for the speed of the link to the AP 131 may be configured to any value other than 2 Mbps, and the invention is not limited thereto.

Subsequent to step S910, if so, the mobile communication device 110 further determines whether a link to the cellular network 120 is available and whether the speed of the link to the cellular network 120 is greater than the speed of a GPRS link (step S920). Specifically, the mobile communication device 110 may first perform an attachment procedure to register to the cellular network 130, and a link to the cellular network 120 is available if the registration is successful. The speed of the link to the cellular network 120 may be determined according to the system information broadcasted by the cellular network 120, and in general, the speed of a GPRS link is up to 80 Kbps for downlink and 20 Kbps for uplink with Coding Scheme 4 (CS-4). In another embodiment, if the type of wireless service in use requires a higher data rate, the mobile communication device 110 may instead determine, in step S920, whether the speed of the link to the cellular network 120 is greater than (or equal to) the speed of a WCDMA link, an HSPA link, or an LTE link.

If a link to the cellular network 120 is available and the speed of the link is greater than the speed of a GPRS link, then the mobile communication device 110 conducts handover from the non-cellular network 130 to the cellular network 120 (step S930), and then disconnects with the non-cellular network 130 and enters the "Cellular-connected" state. In another embodiment, before step S930, the mobile communication device 110 may prompt the user to confirm whether to proceed to perform handover from the non-cellular network 130 to the cellular network 120, and only proceed to step S930 when the user confirms the decision. Subsequent to steps S910 and S920, if not, the mobile communication device 110 stays in the "WiFi-associated" state and waits for the next periodic check on the speed of the link to the AP 131.

Figure 10:
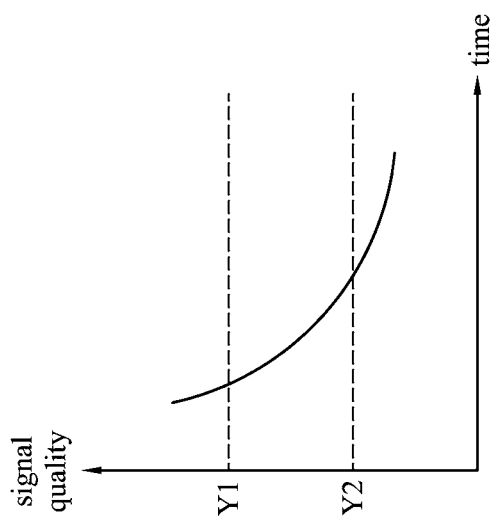
FIG. 10 is a curve diagram illustrating a 2-stage monitoring for the signal quality of nearby WLANs according to another embodiment of the invention.

It is noted that, before performing the smart handover method of FIG. 9, the mobile communication device 110 may first perform a 2-stage monitoring of the signal quality of any nearby non-cellular network, as shown in FIG. 10. In the first stage, the mobile communication device 110 may periodically detect the signal quality of the non-cellular network 130 in every N seconds, wherein N may be configured to be 6, 15, or any other number, depending on the power-saving settings of the mobile communication device 110. If once the signal quality of the non-cellular network 130 is detected to be lower than a first threshold Y1, then the mobile communication device 110 proceeds to the second stage where it continues to monitor the signal quality of the non-cellular network 130 and detect its moving direction against the non-cellular network 130. When the signal quality of the non-cellular network 130 is lower than a second threshold Y2 and it is detected that the mobile communication device 110 is moving away from the AP 131, the mobile communication device 110 may perform the smart handover method of FIG. 9, wherein the first threshold Y1 is greater than the second threshold Y2. Specifically, the moving direction of the mobile communication device 110 may be determined by calculating the moving average of the monitored signal quality of the non-cellular network 130. For the calculation of the moving average, reference may be made to the related descriptions of FIGS. 8A and 8B.

While the invention has been described by way of example and in terms of preferred embodiment, it is to be understood that the invention is not limited thereto. Those who are skilled in this technology can still make various alterations and modifications without departing from the scope and spirit of this invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A mobile communication device, comprising:
   a first processing logic unit configured to connect the mobile communication device to a first wireless network for wireless transceiving via a first link;
   a second processing logic unit configured to scan for a nearby second wireless network with a current signal quality, wherein the first wireless network and the second wireless network are heterogeneous networks;
   a third processing logic unit configured to apply a condition check on the current signal quality of the second wireless network according to a result of whether the mobile communication device was previously connected to the second wireless network prior to being connected to the first wireless network; and
   a fourth processing logic unit configured to hand over the mobile communication device from the first wireless network to the second wireless network in response to passing of the condition check,
   wherein the condition check comprises:
      determining whether the current signal quality of the second wireless network is greater than a predetermined threshold, if the mobile communication device was not previously connected to the second wireless network prior to being connected to the first wireless network; and
      determining whether the current signal quality of the second wireless network is greater than the sum of a previous signal quality of the second wireless network, which was obtained when the mobile communication device was previously connected to the second wireless network prior to being connected to the first wireless network, and a margin value for eliminating a ping-pong effect.

2. The mobile communication device of claim 1, wherein the step of handing over the mobile communication device further comprises:
   connecting to the second wireless network via a second link; and
   disconnecting with the first wireless network.

3. The mobile communication device of claim 1, wherein the first wireless network is a cellular network and the second wireless network is a non-cellular network.

4. The mobile communication device of claim 3, wherein the non-cellular network is a Wireless Local Area Network (WLAN), Bluetooth Personal Area Network (BT PAN), or ZigBee Wireless PAN (ZigBee WPAN).

5. A method for a mobile communication device to handover between a plurality of heterogeneous networks, comprising:
   connecting to a first wireless network for wireless transceiving via a first link;
   scanning for a nearby second wireless network with a current signal quality, wherein the first wireless network and the second wireless network are heterogeneous networks;
   applying a condition check on the current signal quality of the second wireless network according to a result of whether the mobile communication device was previously connected to the second wireless network prior to being connected to the first wireless network; and
   handing over the mobile communication device from the first wireless network to the second wireless network in response to passing of the condition check,
   wherein the condition check comprises:
      determining whether the current signal quality of the second wireless network is greater than a predetermined threshold, if the mobile communication device was not previously connected to the second wireless network prior to being connected to the first wireless network; and
      determining whether the current signal quality of the second wireless network is greater than the sum of a previous signal quality of the second wireless network, which was obtained when the mobile communication device was previously connected to the second wireless network prior to being connected to the first wireless network, and a margin value for eliminating a ping-pong effect.

6. The method of claim 5, wherein the step of handing over the mobile communication device further comprises:
   connecting to the second wireless network via a second link; and
   disconnecting with the first wireless network.

7. The method of claim 5, wherein the first wireless network is a cellular network and the second wireless network is a non-cellular network.

8. The method of claim 7, wherein the non-cellular network is a Wireless Local Area Network (WLAN), Bluetooth Personal Area Network (BT PAN), or ZigBee Wireless PAN (ZigBee WPAN).

* * * * *